US009362800B2

(12) United States Patent
Chiao et al.

(10) Patent No.: US 9,362,800 B2
(45) Date of Patent: Jun. 7, 2016

(54) FLYWHEEL SYSTEM USING WIRE-WOUND ROTOR

(75) Inventors: Edward Young Chiao, San Jose, CA (US); Donald Arthur Bender, San Ramon, CA (US); Andrew E. Means, Livermore, CA (US); Philip K. Snyder, Livermore, CA (US)

(73) Assignee: Amber Kinetics, Inc., Freemont, CA (US)

( * ) Notice: Subject to any disclaimer, the term of this patent is extended or adjusted under 35 U.S.C. 154(b) by 1155 days.

(21) Appl. No.: 13/222,693

(22) Filed: Aug. 31, 2011

(65) Prior Publication Data

US 2012/0062154 A1    Mar. 15, 2012

Related U.S. Application Data

(60) Provisional application No. 61/379,373, filed on Sep. 1, 2010, provisional application No. 61/385,141, filed on Sep. 21, 2010, provisional application No. 61/483,639, filed on May 7, 2011, provisional application No. 61/483,640, filed on May 7, 2011.

(51) Int. Cl.
*H02K 3/47* (2006.01)
*H02K 7/02* (2006.01)
*H02K 21/12* (2006.01)

(52) U.S. Cl.
CPC .......... *H02K 7/025* (2013.01); *H02K 3/47* (2013.01); *H02K 21/12* (2013.01); *Y02E 60/16* (2013.01); *Y10T 74/2119* (2015.01)

(58) Field of Classification Search
CPC ........ F16F 15/305; F16F 15/30; Y02E 60/16; H02K 7/025; H02K 3/47; H02K 21/12; Y10T 74/212; Y10T 74/2132
See application file for complete search history.

(56) References Cited

U.S. PATENT DOCUMENTS

| | | |
|---|---|---|
| 3,672,241 A | 6/1972 | Rabenhorst |
| 3,698,262 A | 10/1972 | Rabenhorst |
| 3,724,288 A | 4/1973 | Jakubowski |
| 3,737,694 A | 6/1973 | Rabenhorst |
| 3,913,828 A | 10/1975 | Roy |
| 3,964,341 A | 6/1976 | Rabenhorst |
| 4,023,437 A | 5/1977 | Rabenhorst |
| 4,187,738 A | 2/1980 | Knight, Jr. et al. |
| 4,198,878 A | 4/1980 | Lewis et al. |
| 4,359,912 A | 11/1982 | Small |
| 4,468,269 A | 8/1984 | Carey |
| 4,660,435 A | 4/1987 | Davis et al. |
| 5,057,071 A | 10/1991 | Piramoon |
| 5,065,060 A | 11/1991 | Takahashi et al. |
| 5,124,605 A | 6/1992 | Bitterly et al. |
| 5,285,699 A | 2/1994 | Walls et al. |

(Continued)

FOREIGN PATENT DOCUMENTS

DE    2454425 A    * 5/1976    ............ F16F 15/305

OTHER PUBLICATIONS

PCT International Search Report and Written Opinion, PCT/US2011/049970, Feb. 29, 2012, 20 Pages.

*Primary Examiner* — Thomas Diaz
(74) *Attorney, Agent, or Firm* — Fenwick & West LLP

(57) ABSTRACT

A flywheel is described having a rotor constructed of wire wound onto a central form. The wire is prestressed, thus mitigating stresses that occur during operation. In another aspect, the flywheel incorporates a low-loss motor using electrically non-conducting permanent magnets.

52 Claims, 8 Drawing Sheets

(56) References Cited

U.S. PATENT DOCUMENTS

| | | |
|---|---|---|
| 5,614,777 A | 3/1997 | Bitterly et al. |
| 6,508,145 B1 * | 1/2003 | Gabrys ............... 74/572.11 |
| 6,531,864 B2 | 3/2003 | Montagu |
| 6,583,528 B2 | 6/2003 | Gabrys |
| 6,794,777 B1 | 9/2004 | Fradella |
| 6,852,401 B2 | 2/2005 | Spears et al. |
| 6,864,613 B1 | 3/2005 | Graham et al. |
| 6,995,529 B2 | 2/2006 | Sibley |
| 7,111,618 B1 | 9/2006 | Walker |
| 7,305,752 B2 | 12/2007 | Graham et al. |

* cited by examiner

FLYWHEEL SYSTEM USING WIRE-WOUND ROTOR

CROSS-REFERENCE TO RELATED APPLICATION(S)

This application claims priority under 35 U.S.C. §119(e) to the following U.S. Provisional Patent Applications:

Ser. No. 61/379,373, "Low Cost High Energy Storage Density Wire-Wound Flywheel And Method," filed by Edward Young Chiao on Sep. 1, 2010;

Ser. No. 61/385,141, "Method and Process For a Flywheel Energy Storage Rotor For Benign Failure Modes," filed by Edward Young Chiao on Sep. 21, 2010;

Ser. No. 61/483,639, "Design of a Flywheel Energy Storage Rotor," filed by Edward Young Chiao on May 7, 2011; and Ser. No. 61/483,640, "A Low Loss Motor-Generator For Flywheel Energy Storage Systems," filed by Edward Young Chiao on May 7, 2011.

The subject matter of all of the foregoing is incorporated herein by reference in their entirety.

GOVERNMENT RIGHTS LEGEND

This invention was made with government support from the U.S. Department of Energy, managed by the National Energy Technology Laboratory, under contract ID: OE-0000232. The government has certain rights in the invention.

BACKGROUND OF THE INVENTION

1. Field of the Invention

This invention relates generally to flywheel energy storage systems as may be suitable for stationary and mobile energy storage applications. More specifically, this invention relates to flywheel systems that use wire-wound rotors.

2. Description of the Related Art

A number of materials have been used to construct rotors for energy storage flywheels. The selection of rotor material dictates the configuration of the system and sets a floor below which rotor cost may not be reduced.

Rotors in commercially available flywheel systems have been constructed from forged steel and from carbon and glass fiber composites. However, forged steel rotors suffer from low tensile strength compared to alternatives, thus limiting the amount of energy they can store.

Composite rotors also have their own significant drawbacks. Composite rotors are typically fabricated by laying down thousands of microfibers with wet epoxy, where the rotor reaches its full strength once the epoxy has fully cured. However, in order to store appreciable energy, flywheel rotors are typically much thicker than other cylindrical composite structures, such as pressure vessels. As a result, the fabrication process is more complicated compared to thinner structures and can become slow and expensive. For example, sufficient time and care must be taken to allow the epoxy to set during winding, to prevent the microfibers from unduly compressing the underlying layers, and to allow sufficient heat release during the epoxy curing process. Any inattention can result in structural weaknesses in the rotor. Some of these problems can be reduced by making the composite layer thinner, but then either more mass must be added in the axial direction or the rotor must be operated at a higher speed in order to store the same amount of energy. Composites are also less dense than metals, so composite rotors must be spun at higher speeds in order to store the same amount of energy as a comparably-sized metal rotor.

Thus, there is a need for improved rotor designs.

SUMMARY OF THE INVENTION

The present invention overcomes various limitations by providing a wire-wound rotor.

In one aspect, a wire-wound rotor is intended for use in a flywheel that is rated for a certain operational speed range. The rotor includes a flywheel core and a mass of wire. The flywheel core has a winding surface, which is circular in cross-section with respect to a central axis of the rotor. The mass of wire is wound onto the winding surface of the flywheel core. The wire is preloaded such that the outermost layer of wire exerts a net radial force that is compressive throughout the operational speed range of the flywheel. In this way, the outermost layer of wire will always be exerting force to hold the mass of wire together.

There are many variations of this rotor design, including with respect to the wire itself, the winding pattern of the wire onto the flywheel core, the preloading schedule for the wire, and the geometry and construction of the flywheel core. Some of these variations are expressly described below. In a preferred approach, the wire is steel wire and the wire mass accounts for a significant fraction of the energy storage of the flywheel.

In another aspect, a flywheel assembly uses a wire-wound rotor. The flywheel assembly further includes a shaft and a motor/generator. In a preferred approach, the rotor for the motor/generator uses electrically non-conductive permanent magnets, for example ceramic ferrite magnets. The flywheel assembly also includes other components, typically a vacuum vessel (so the rotor rotates in vacuum) and various bearings.

One application for flywheel assemblies is frequency regulation. A flywheel energy storage system is connected to a utility electricity grid. A controller transfers energy between the flywheel energy storage system and the utility electricity grid based on mismatches between electricity generation on the grid and electricity load on the grid.

The various aspects are not required to be used with each other. For example, wire-wound rotor designs could be used with other flywheel assemblies or for applications other than the frequency regulation application. Similarly, a motor/generator using electrically non-conductive permanent magnets could be used with other rotor designs or for other applications.

Other aspects of the invention include methods and additional applications for the devices and systems described above.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
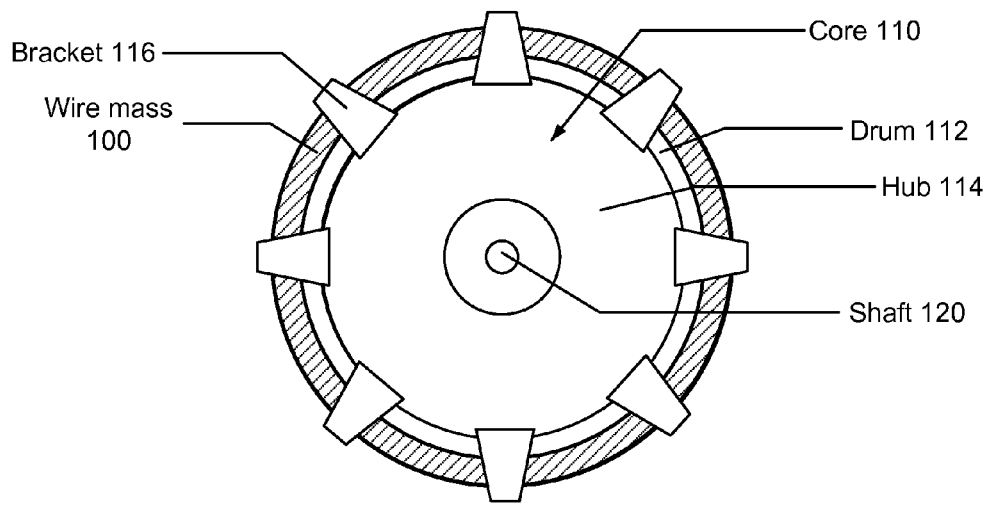
FIGS. 1-3 are a top view, side view and isometric view of a wire-wound rotor assembly.
Figure 2:
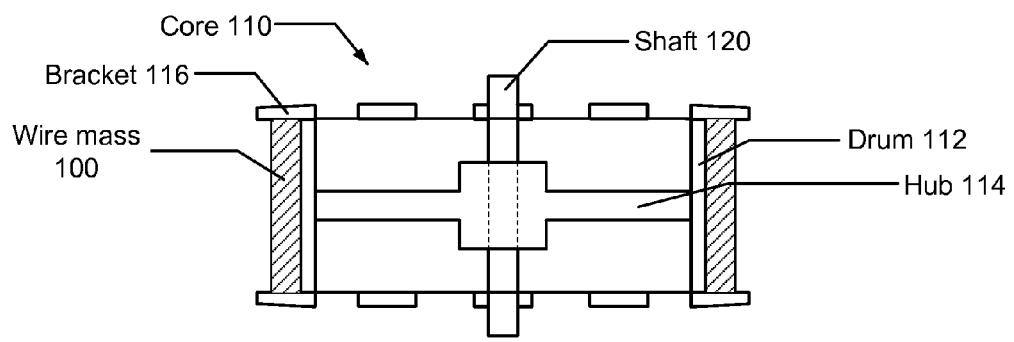
Figure 3:
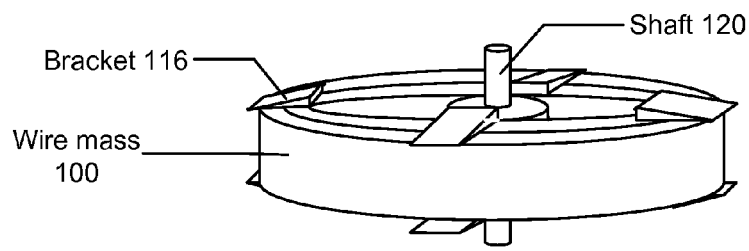

FIGS. 1-3 are a top view, side view and isometric view of a wire-wound rotor assembly in accordance with the invention. The rotor assembly includes a mass of wire 100 which is wound onto a flywheel core 110 mounted on a central shaft 120. The term "axial" refers to the (z) direction along the shaft 120, while "radial" refers to the (r) direction from the center of rotation outwards/inwards. The central axes of the wire mass 100, flywheel core 110 and central shaft 120 are all collinear. The winding surface of the core (i.e., the surface onto which the wire 100 is wound) preferably is round at any axial cross-section, although the radius could vary in the axial direction. The winding surface of the flywheel core could be sub-circular (e.g., hexagon, octagon) in shape, although that is generally not preferred.

In this particular example, the flywheel core 110 includes a drum 112 and hub 114. The round drum 112 could be a composite or metallic ring. The wire 100 is supported/constrained axially by support brackets 116 which extend beyond the outer surface of the drum 112. The drum 112 interfaces to the hub 114, which is connected to the shaft 120 supported by bearings.

The choice of wire 100 is an important design aspect. Preferably, it should be low in cost, higher than 300,000 pounds per square inch (psi) in tensile and yield strength, and amenable to straightforward manufacturing. Drawn steel wire is a suitable material choice to meet the above requirements.

Drawn steel wire is good choice because it is a low cost, abundant material with estimated tensile strengths exceeding 300,000 psi. In some cases, drawn steel wire with tensile strengths exceeding 400,000 psi have been measured and can be applied to the flywheel architecture described in this disclosure. This can include steel wire with carbon concentrations preferably between 0.50% and 0.99%. Within this level of carbon content, steel wire can be work hardened with manganese to improve the harden-ability of the carbon steel. The low cost and high strength properties of the resulting material lend itself well to usage in a flywheel energy storage system.

Furthermore, unlike carbon or Kevlar fiber and fiberglass materials, steel wire can withstand significant tension during the winding process, and therefore sufficient radial compressive stress can be built into the flywheel rotor during the manufacturing process. This can be done for both radially thin and thick flywheel rotors. Steel wire also compares favorably to traditional alloy steel flywheel rotors, which exhibit lower ultimate tensile strengths, for example approximately 200,000 psi.

The remainder of this disclosure will assume the use of steel wire, although the invention is not limited to steel. Other high strength wires, for example possibly tungsten or titanium, could also be used.

The wires preferably are wound with sufficient preload to ensure that, for each pair of neighboring wire layers, the outer wire layer always exerts a radial compressive force on the inner wire layer throughout the operational speed range of the flywheel. Depending on the application, the preloaded stress on the steel wire can exceed 50,000 psi in the outermost layers of the flywheel during the winding process.

This preload can be achieved through the use of standard wire winding machines equipped with tensioning systems to introduce sufficient tension on the wire during the winding process. A major advantage of constructing flywheel rotors out of steel wire is the high preload stress that can be applied to the wire compared with carbon fiber or fiberglass materials.

Figure 4:
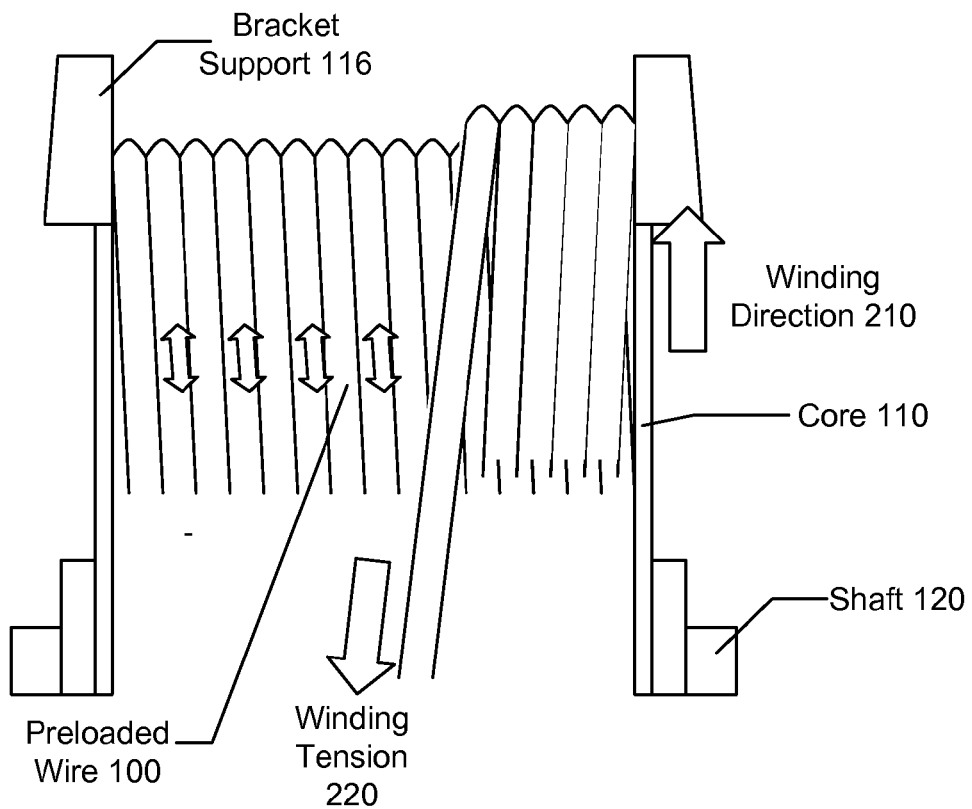
FIG. 4 illustrates a wire winding process.

FIG. 4 illustrates a wire winding process. The flywheel core 110 is rotated in direction 210. This winds wire 100 onto the core. The wire 100 is under tension 220 during the winding process. As a result, the wire mass 100 is preloaded with hoop tension. Multiple wires may also be preloaded and wound concurrently.

Figure 5:
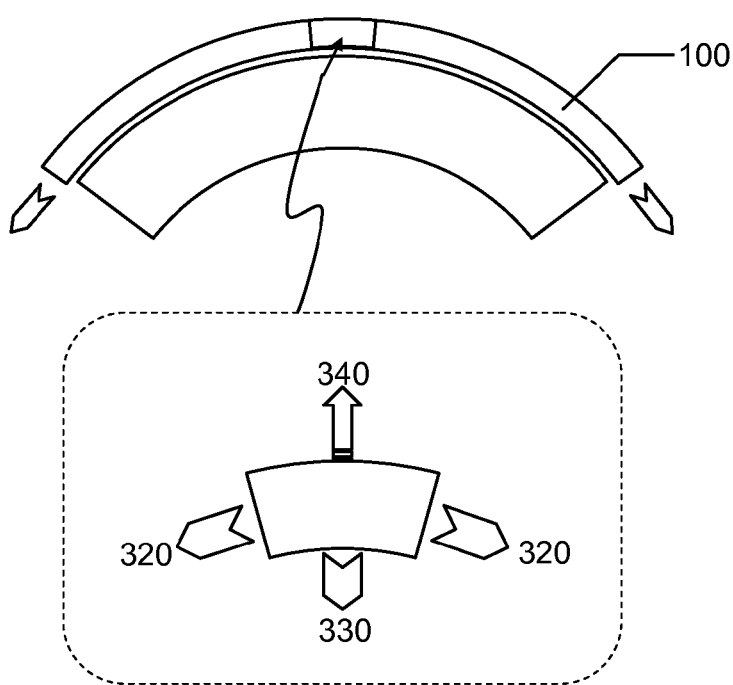
FIG. 5 is a diagram of forces on a section of wire.
Figure 6:
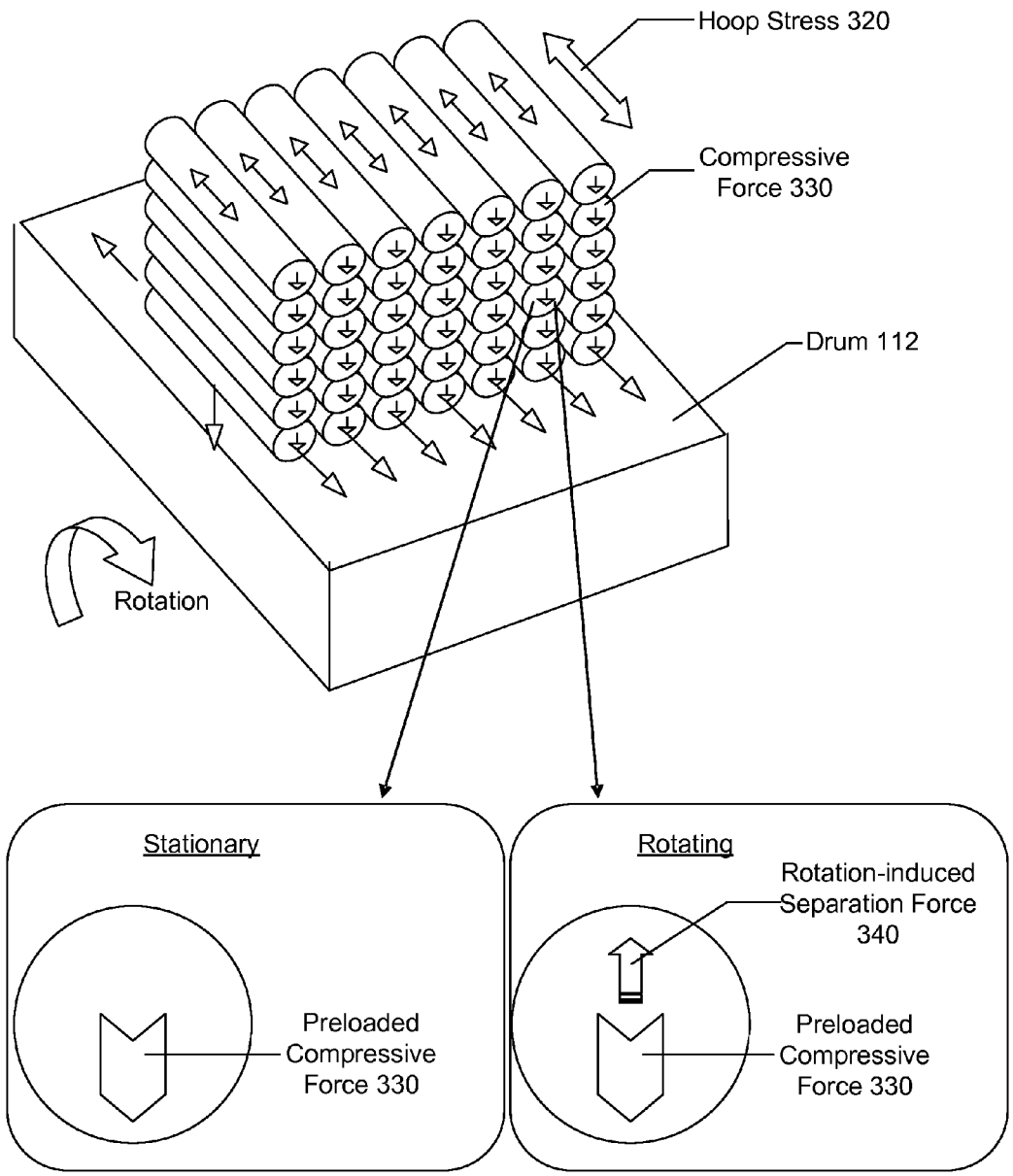
FIG. 6 illustrates forces in the wire mass.

FIG. 5 is a diagram showing forces on a section of wire 100. The hoop stress 320 results in a radial compressive force 330. In addition, the outer layers of filament wire will also exert a cumulative compressive force upon the inner layers beneath, as illustrated in FIG. 6. The cumulative compressive force from the outer wire layers, coupled with the compressive force generated by the hoop stress, results in a net preloaded compressive force 350 on each wire layer. When the flywheel is not rotating, there is no radial separation force acting upon the wires. Furthermore, the compressive force exerted by an outer layer helps to relax the initial tension felt by its inner layers. As a result, sufficient layers of wire could actually result in the inner layers being relaxed out of tension and gone into hoop compression at 0 rpm. However, the rotor is designed so that, even if a particular wire layer is in hoop compression, the cumulative compressive force from the outer wire layers results in a net radial preload 350 that is still compressive. In fact, hoop compression at 0 rpm can be used advantageously because it allows a weaker material to be used on the drum and inner layers of wire compared to the outer layers of wire. However, too much hoop compression would collapse the drum, so it is important to limit the amount of compression so as to avoid buckling of the inner drum or wire layers.

Upon spinning up the flywheel, the wires begin to experience a rotation-induced tensile stress in addition to the built-in tensile stress already introduced during the winding process. While rotating, the outermost layer of wires experience more rotation-induced tensile stress than the inner wire layers. The rotation-induced tensile stress causes a radial separation force 340 to develop that increases with the rotational speed. This rotation-induced separation force relaxes the preloaded radial compressive force 350 between layers in the wire bundle. Separation of the neighboring layers may take place when the rotation-induced separation force 340 exceeds the preloaded compressive force 350. Therefore, the winding preload preferably is made sufficiently high so that the preloaded compressive force 350 is greater than the rotation-induced separation force 340 throughout the operating speed range of the flywheel. In this way, the net radial force will be compressive throughout the operational speed range, and the steel wire rotor will remain intact as integral and rigid with no radial separation between its wire layers. Furthermore, the absence of internal layer movement should greatly reduce any surface abrasion problems that might affect long-term durability.

However, preloading the wire during the winding process pre-stresses the wire and reduces the amount of stress available in the material before failure. Subsequently, preloading tends to reduce the resulting maximum allowable hoop tensile stress in the flywheel. Therefore, the winding preload preferably is controlled such that only a minimum required amount of preload is placed on the wire to hold the winding stable. This will maximize the remaining amount of operating stress available.

Different preloading schedules can be used. In one approach, the winding tension is held constant throughout the entire winding process of the flywheel rotor. As a result, the same winding tension is applied to all wires, regardless of location within the wire mass.

In another approach, the winding tension varies as a function of the location of the wire layers. For example, higher winding tensions could be used on the outer wire layers. This would allow the flywheel rotor to spin faster before the compressive force between the neighboring outer layers gives way to separation, assuming the outer layer wires can handle the additional operating stress.

Whatever schedule is used for the winding tension or for the preload compressive force, it is preferable that the resulting preload compressive force is sufficient to hold the wire layers in compression when the flywheel is not rotating while maximizing the operating speed limit of the flywheel.

Another important consideration is the compressive strength of the flywheel core. Similar considerations also apply to other structural elements on the flywheel, such as the drum, hub and the hub's supporting flanges or brackets. Each successive wire layer upon which is wound under tension exerts a compressive force on the inner layers beneath it. For a flywheel rotor with, for example, several hundred layers of steel wire wound under tension, there can be a large compressive force exerted on the inner layers, hub, axial support flanges, and flywheel core. For thicker flywheels, the build-up of compressive stress on the inner components can be high enough such that the material selection of the drum should be able to withstand the compressive force of the wire bundle and be appreciably thick so as to prevent failure of the drum during the manufacturing process. These stresses should be evaluated as part of the flywheel design so as not to introduce compressive forces beyond what the inner layers and hub, flywheel core and flanges can withstand. In a simplified design, where material utilization is of lower concern, the flywheel core could be a solid metallic rotor.

With the flywheel at standstill, the winding form and all the inner wire layers experience compressive forces if the wires are wound under tension. In an optimized rotor design, when the flywheel rotor begins to spin up to maximum design speed, the flywheel core and inner layers of wire will experience tensile stress and a radial separation force. In this scenario, the wires are acting as a wrap surrounding the flywheel core. This wrap acts as a reinforcement to tensile stress. Therefore, the flywheel core can be spun up to a higher spin speed than the flywheel core could safely withstand by itself without the wires. This optimizes the flywheel core material as well as it relates to storing energy.

In a preferred embodiment, the flywheel rotor is optimized to store maximum energy using the smallest installed space. This can be achieved with a flywheel design where the wire mass occupies the shape of a thick ring. For example, in one distance, the measured distance between the outer diameter and inner diameter of the wire mass would be greater than 15%. While this design does not maximize the material utilization of the steel wire, this shape aims to maximize total energy stored using the least amount of total space, and therefore contributes to a flywheel design where more energy can be stored for a given footprint size compared to a thin ring.

Once a flywheel rotor shape has been established, steel wire may be wound over a flywheel core. The wire preferably has a rated ultimate tensile strength greater than 300,000 psi. Each wire layer preferably is preloaded with an appropriate amount of tension. In some layers, the appropriate amount of tension could be zero, for instance, in the innermost layers. In an example embodiment, we chose a range around 35,000 psi of winding tension, or in the range of 4 pounds of winding tension for a 0.3 mm diameter wire. In this case, 0.3 mm diameter wire was chosen due to its tensile strength rating of over 300,000 psi.

The wire is wound perpendicular to the rotating axis, or as close as possible to a perpendicular 90-degree angle to the rotating axis. One or more wires can be wound at the same time to increase manufacturing throughput. For the same layer, each turn of wire should touch but not overlap the neighboring wire turn. When the wire reaches the end of the flywheel rotor, the next layer may be wound on top of the prior layer. The winding may go in the opposite direction of the previous layer.

In this embodiment, the outermost wire layer is expected to fail first, and should experience greater than 300,000 psi of hoop stress before failing. Furthermore, preloading the wire with 4 lbs of tension generates a radial load on the wires pointing radially inward. This radial inward force keeps the neighboring wire layers in compression when the flywheel begins to rotate.

At higher rotational speed, the radial inward force begins to decrease and therefore the compressive force between the wires decreases. When the compressive force between the wire layers goes to zero, the wire layers are free to separate. Therefore, the objective is to preload the wires with sufficient tension to keep a radial inward force on the wires at the maximum design speed chosen. One advantage of using steel wire is the ability to produce a thick flywheel rotor simply by increasing the preload tension on the wire during the manufacturing process, ensuring that the compressive force between layers is always greater than the radial separation force over the flywheel's operating range.

In this embodiment, the flywheel core is a solid ring-shaped drum over which multiple wire layers are wound. Each successive wire layer introduces an additive amount of compressive hoop stress onto the flywheel core or drum, as shown previously. Proper consideration of the drum material's yield stress should be factored into the flywheel design when determining the amount of preload to place on the wires. The wire layers will generate a compressive hoop stress felt on the flywheel core, which can serve as an advantage, allowing the flywheel core to rotate at higher speeds than it could without the preloaded wires.

Optionally, the outermost wire layers can be secured to the inner layers by using an epoxy resin specifically designed for bonding metals. The epoxy resin would allow the wire layers to stay in a fixed position. During flywheel operation, the wires will then better maintain the preloaded tension developed during the manufacturing process. The outermost wire layers could also be secured by a mechanical constraint, with Kevlar and epoxy wraps, or by other means.

The flywheel rotor described above is merely an example. Other variations are also possible, depending on the application and design goals. For example, there can be different shapes, sizes and constructions for the flywheel core, shaft and axial supports for the wire mass. Whether these components are separate and then assembled, or integral parts, can also vary from one design to another. There can also be variations in the overall shape, size and construction of the wire mass, as well as in the individual wire itself. The winding pattern and preload schedule can also vary. The following discussion, including FIGS. 7-13, illustrates some variations.

Figure 7:
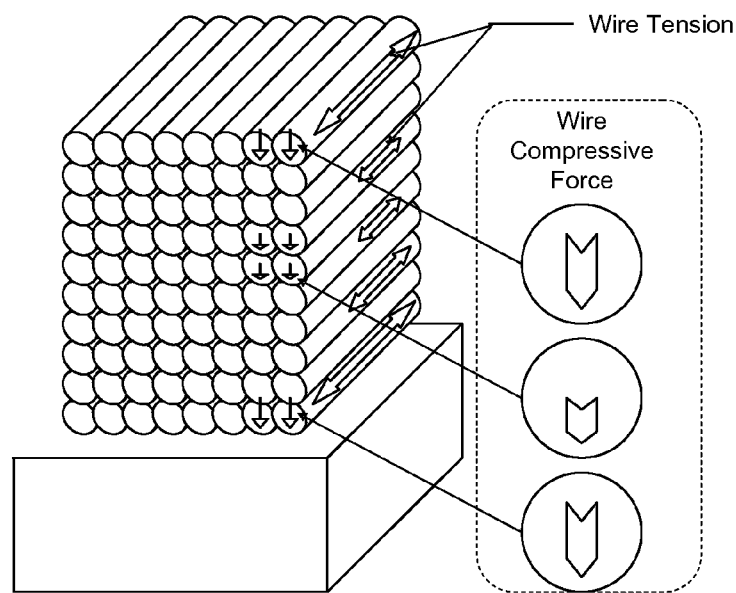
FIG. 7 illustrates wire winding with variable winding tension.

Regarding the preload schedule, in one variation, the innermost wire layers could be wound with higher preload tension to induce a higher compressive stress on the flywheel core. This would assist in keeping the flywheel core in a compressive state longer when the flywheel is rotating, thus permitting the flywheel to spin up to higher speeds. As another example, the middle wire layers could be wound with lower tension compared to both the innermost and the outermost layers, as shown in FIG. 7.

In yet another embodiment, the innermost wire layers could be wound with lower preload tension to induce a lower compressive stress on the flywheel core, which is particularly desirable for thicker flywheel rotors where the build-up of compressive stress on the inner flywheel core can be very high. The preload on the wire could be gradually increased from inner to outer layers so that the outer layers are kept in compression longer before succumbing to radial separation force during flywheel operation.

In another embodiment, the flywheel core could be a steel wire-wound ring bonded with a matrix material such as epoxy resin, vinyl ester resin or another suitable bonding agent. In this embodiment, several wire layers combined with a bonding agent would form a solid ring-shape structure over which the wire layers are wound.

In another embodiment, the wire wound flywheel can be optimized to store the maximum energy in the smallest amount of space. This can be achieved with a flywheel design where the flywheel rotor takes the shape of a thick ring or a completely solid rotor with no bore hole.

In still another embodiment, the wire used may vary in diameter and may utilize different carbon concentrations, ultimate tensile strength properties, ductility, and fatigue strength. One approach to incorporate lower cost wire of larger diameter and lower fatigue strength would be to use this material on the inner layers. The inner wire layers experience lower hoop stress compared to outer layers. Therefore, the higher strength material could be reserved for the outer layers. When wound under preload, one goal is usually to keep the inner layers under compression at zero rpm. It is also important to note that when calculating the winding preload, the amount of stress on the wire is a function of the winding tension on the wire divided by the cross sectional area of the wire. For the same amount of winding force, a larger diameter wire will experience less stress than a smaller diameter wire.

Figures 8, 9:
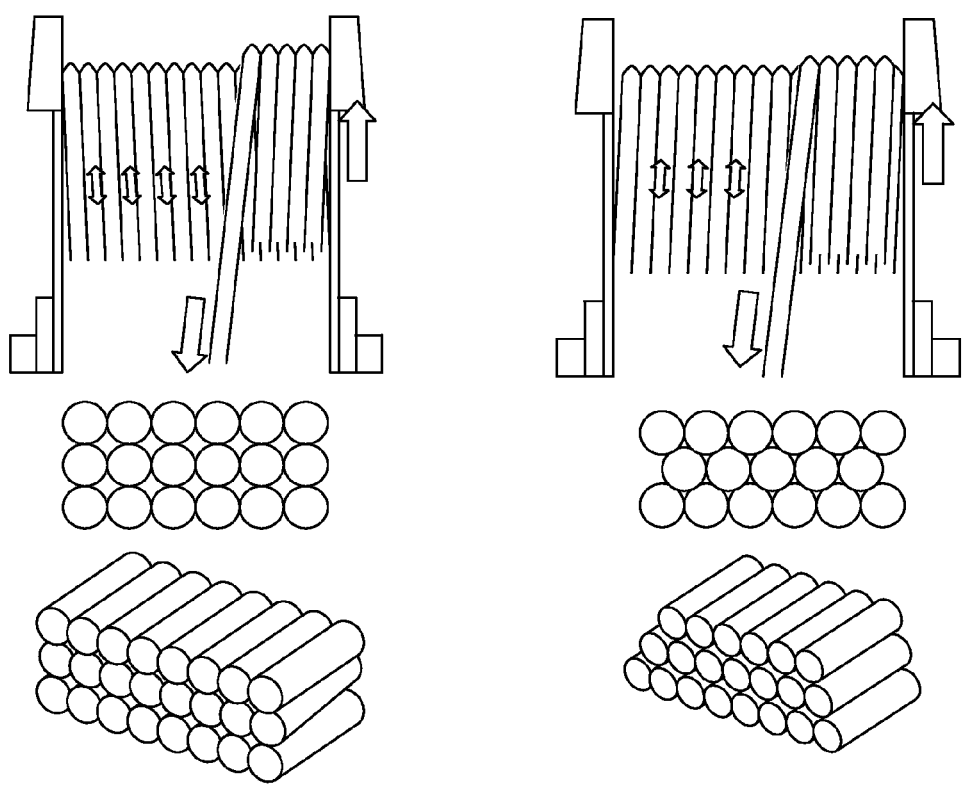
FIGS. 8-10 illustrate various wire winding patterns.

With respect to winding patterns, FIG. 8 depicts an example winding pattern. In this depiction, each successive layer of wire crosses over the previous layer at an opposite angle. The winding can also be controlled to increase or maximize wire packing density, where the cylindrical wires are layered in such a way that one layer rests in the valley of the prior layer.

To form a denser pack of wire winding, round steel wire winding can achieve higher packing density by winding in the same direction for each layer. The subsequent layer of wire will sit in the valley area from wires wound from previous layer as shown in FIG. 9. The packing density can be increased by up to 15% compared to a more conventional continuous winding pattern, as shown in FIG. 8. Since the layers of wires are in close contact with each other, wire movement can be reduced.

Figure 10:
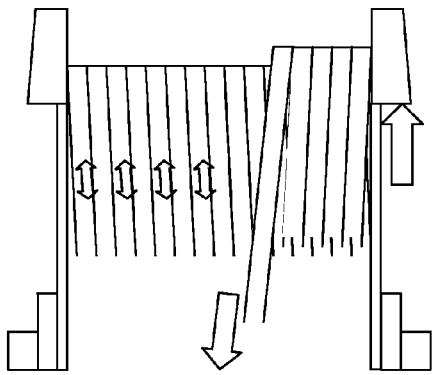
Figure 10:
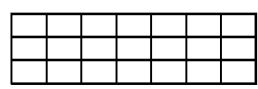
Figure 10:
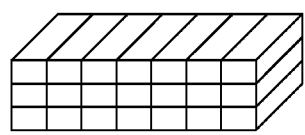
Figure 13:
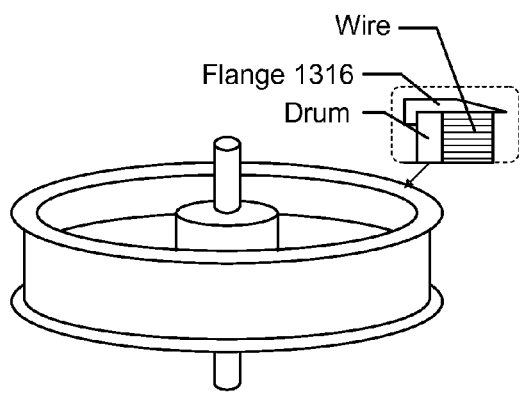
FIG. 13 is an isometric view of a wire-wound rotor assembly with a continuous flanged wire support.

FIG. 10 shows another embodiment for increasing the packing density, based on utilizing square wire. Square (or rectangle) wire can be used to wind flywheel filaments to achieve up to 100% packing density. Because each wire is in contact with other wires in all four directions, wire movement due to material fatigue or mechanical motion (spin up and down) can be minimized. The layers of wire can be wound in the same direction for each layer, or they can be wound in opposite directions between each layer. At the ends of each layer, there may be some wire that sits in the valley of the wire layer below it before it continues to be wound in the opposite direction.

In still another embodiment, the wire could also be mixed with a bonding agent such as an epoxy resin, to fix the ends of the steel wire in place. A bonding agent could prove beneficial, particularly on the innermost layers of wire, where there is contact between the wire and the brackets and/or mandrel form. A bonding agent on the outermost layer or layers of the steel wire can be used to fix the end in place or to help prevent separation of wire layers at the outermost edge during operation.

The innermost wire layers could be combined with this matrix material to form the flywheel core. One advantage of a composite core using high strength wires is the structure's increased tensile strength over traditional metallic cores.

Furthermore, the preferable shape of the flywheel rotor should either resemble a flat disc shape or a long upright cylinder shape. The advantage of either a short and wide flywheel rotor or a tall and long flywheel rotor serves to keep unwanted rotordynamic problems from occurring during the flywheel's intended operating speeds.

FIGS. 11-14 show another embodiment that incorporates multiple independent wire layers. This example is designed such that in the event of a failure where the outermost layers of wire are expected to fail, the failure would occur in such a way that the outermost layers would separate from the rest of the flywheel rotor.

Figure 11:
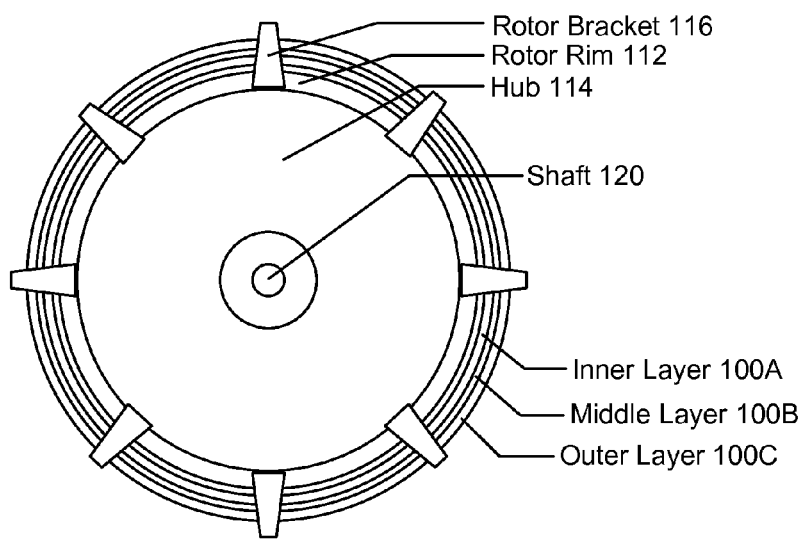
FIG. 11 is a top view of a wire-wound rotor assembly using multiple wire segments.

In FIG. 11, the wire mass 100 is not a single continuous wire. Rather, it contains multiple segments 100A, 100B and 100C. Each length of wire could make up a few thousand feet, and could use a small amount of resin to bond the end of the spool to the wire. A new spool could start where the previous spool left off, and have a light temporary adhesion at the starting point of the spool so as to hold the wire in place until several layers have wrapped over. Each segment can be wound under different preload tension, if so desired.

Figure 12A:
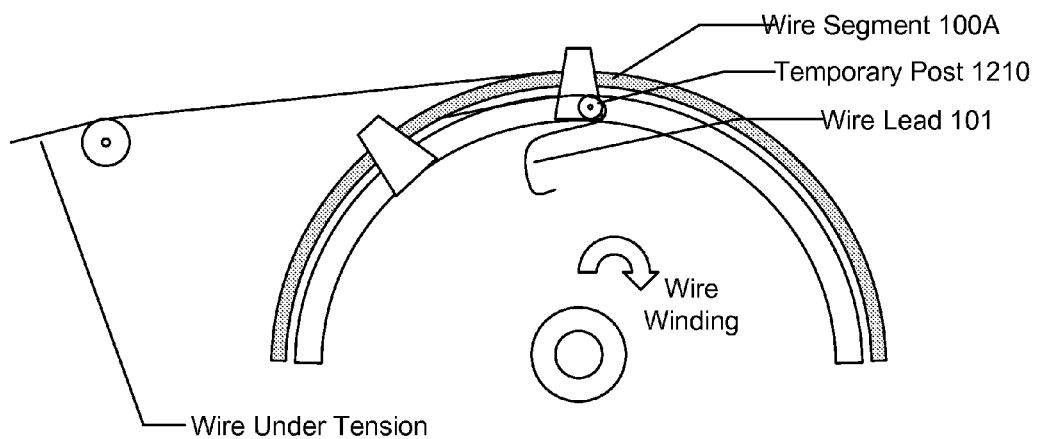
FIGS. 12a-12b illustrates a wire winding process for the rotor assembly of FIG. 11.
Figure 12B:
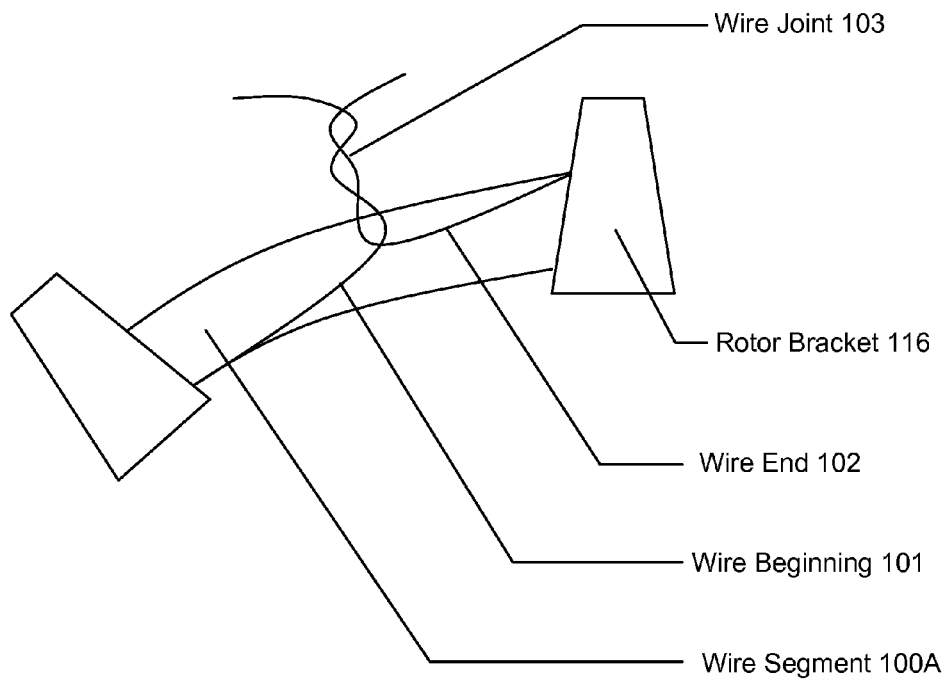

FIGS. 12a-12b illustrate a process for winding different segments. At the beginning of winding, the starting wire lead 101 is tied onto a temporary post 1210 located on one of the brackets 116. When the layer 100A for this segment of wire is completed, the end lead 102 is joined 103 to the starting lead 101 under the same tension, for example as shown in FIG. 12b. A twisted knot or spot welding can be used to join the two wire leads. Once the starting and ending lead are joined together, this segment of wire is independently secured on the rim (if this is the first segment) or secured on the previous segment (for second and later segments).

During high speed rotating conditions, if the outermost wire segment fails, it may be designed to break away in a manner that leaves the inner wire segments intact. By sacrificing a small portion of wire mass in the outer segment, the majority of the wire mass still forms a secure rotor, just slightly smaller.

Another consideration for a wire-wound flywheel rotor design is supporting the wires in the axial direction, especially for a vertically oriented flywheel system. In one approach, support flanges or brackets 116 as shown in FIG. 1 can be used to provide axial support of the wires. In another embodiment, shown in FIG. 13, a continuous flange 1316 could be used to provide axial support for the wires. The axial support structures could be used on the bottom alone, or on the top and bottom of the flywheel rotor. Intermediate supports located between the top and bottom could also be used.

To withstand the high stress on the flanges, it can be advantageous to use segmented brackets instead of one continuous flange to allow the material to expand and relax at high rotation speeds. By using this approach, the system can be designed to use traditional non-exotic materials for the brackets, including aluminum or steel. The brackets could be integrated as part of the flywheel core over which the steel wires are wound. Alternately, the brackets could be mounted in a variety of ways. For instance, they may be connected directly to the hub, shaft, or cylindrical tube that is mated to the hub. The brackets can extend beyond the outermost layer of steel wire, so that during operation, if the steel wire rotor experiences radial displacement, the bracket has sufficient coverage to ensure the wire in the rotor is still axially supported.

In yet another embodiment, the top and bottom of the rotor could employ the use of caps, similar in design to a traditional spool. The flanges on the top and bottom of the rotor could secure the wire in the axial direction.

In still another embodiment, the flywheel core could be manufactured with wires and matrix material using standard wire winding machines. Wire layers could be wound on top of the flywheel core with only the top and bottom edges of the wire layers bonded using a matrix material. This bonding forms an axial support flange from the wire itself.

In still another embodiment, the wire could be preloaded at a slight angle to the axis of rotation. When this occurs, each wire layer will be preloaded at an opposite angle of the prior layer, and multiple layers results in a woven pattern which provides the wire bundle with sufficient axial strength.

In one approach, the flywheel core is designed to have a shape similar to a wire spool with end plates extending beyond the outer diameter of the flywheel core on the axial top and bottom ends, resulting in what resembles a spool. This spool shape can either be a solid shape or a hollow cylinder, so long as the cylinder includes flanges or end plates which extend up to or beyond the flywheel core and are joined to the core forming a spool shape over which bare filament steel wire can be wound. The end plates can be plates or disks. The solid or hollow cylinder of the flywheel core may also be heat treated to work harden the spool, but may not be necessary as the stress felt on the flywheel core (excluding the end plates) may be significantly reduced compared to the stress felt on the end plates, which have larger outer diameters and thus operate at significantly higher tip speeds.

The end plates can be solid disks of either uniform or non-uniform thickness. The solid disk may be heat treated to work harden the metallic material to a tensile strength suitable for flywheel rotor operation. Commonly accepted steel heat treating methods can work harden 4340 steel to tensile strengths greater than 200 ksi, which would be a suitable strength for a flywheel rotor with outer diameter tips speeds greater than 200 m/s or even 250 m/s.

The advantage of using a solid, heat-treated disk for an end plate as opposed to a disk with a hole in it is the solid disk is stronger and experiences reduced tensile loads compared to the hollow disk during flywheel operation. This can result in a flywheel with the outer diameter reaching a tip speed up to 400 m/s. If a disk with a hole is used as a plate end, it is desirable to leave more material around the hole, leaving the disk thicker around the hole to better withstand the higher stress at the hole location. The entire flywheel rotor preferably is not constructed of a solid steel disk because for parts thicker than approximately a few inches, heat treatment and quenching can be uneven between the inner and outer portions of the part, and therefore unsuitable for a flywheel rotor, which typically requires high and uniform strength throughout the part. End plates can be specifically designed to take advantage of the high strength that heat treating and quenching can provide to solid steel plates by keeping the plate thickness appreciably thin compared to the diameter of the plate (critical length). This allows for even and predictable heat treatment and quenching.

For many flywheel rotor designs, it is desirable for the steel wire to make up the majority of the flywheel mass. This is advantageous because the steel wire has high strength and a lower material cost compared to the work hardened end plates and flywheel core. For some thick rotor designs, steel wire could make up over 75% of the total mass of the flywheel rotor. Although for other designs, steel wire material usage could be optimized and make up less than 75% of the total mass of the flywheel rotor.

The end plates and the flywheel core can be joined through interference fit thermal assemblies, or in some cases, by welding. Additionally, the end plates could be enhanced to include stub shafts on one end of each plate pointing away from the flywheel center. The stub shafts could be used to mount to bearings and to interface with a motor/generator. With this approach, the end plates would replace the function of a traditional hub and shaft along the spin axis of the flywheel rotor.

The end plates could also have grooves for interfacing with a magnetic bearing array. The grooves could be cut into the outward facing end plate.

In certain designs, the flywheel core diameter would be approximately 20-75% of the end plate diameter, thus defining the maximum wire mass which can be wound onto the rotor. This type of design can result in a wire mass that is thick in the radial direction. In a design that uses a radially thinner wire mass, the flywheel core diameter might be approximately 75-95% of the end plate diameter.

In another embodiment, the end plate could have a hole through the center to allow a shaft to pass through. In this embodiment, the plate could have a thick center where the hole is located, so as to reduce the stress concentration created by the hole. The plate could then gradually taper out and become thinner as it gets closer to the outer diameter to further withstand tensile stress.

In yet another embodiment, the flywheel core and end plates could be forged as one continuous piece, with a shape similar to a spool and with optional end plates.

The flywheel rotor described above can be integrated into a complete flywheel energy storage system. In various aspects, a complete flywheel energy storage system may include a motor/generator and bearings that are low loss to support a flywheel energy storage system suitable for extended duration charge-discharge times. Examples of motor/generator systems include permanent magnet synchronous motors, brushless DC motors, homopolar induction motors and reluctance type motors. Examples of bearing systems include mechanical ball bearings, permanent magnet bearings, electromagnetic bearings, pin bearings, or a combination of any or all of the above bearing types into a low-loss bearing system. Additionally, a complete flywheel energy storage system often will also include touchdown bearings, a vacuum vessel, a method for maintaining desired vacuum pressure levels, and control electronics for the motor and possibly bearing drives.

Figure 14:
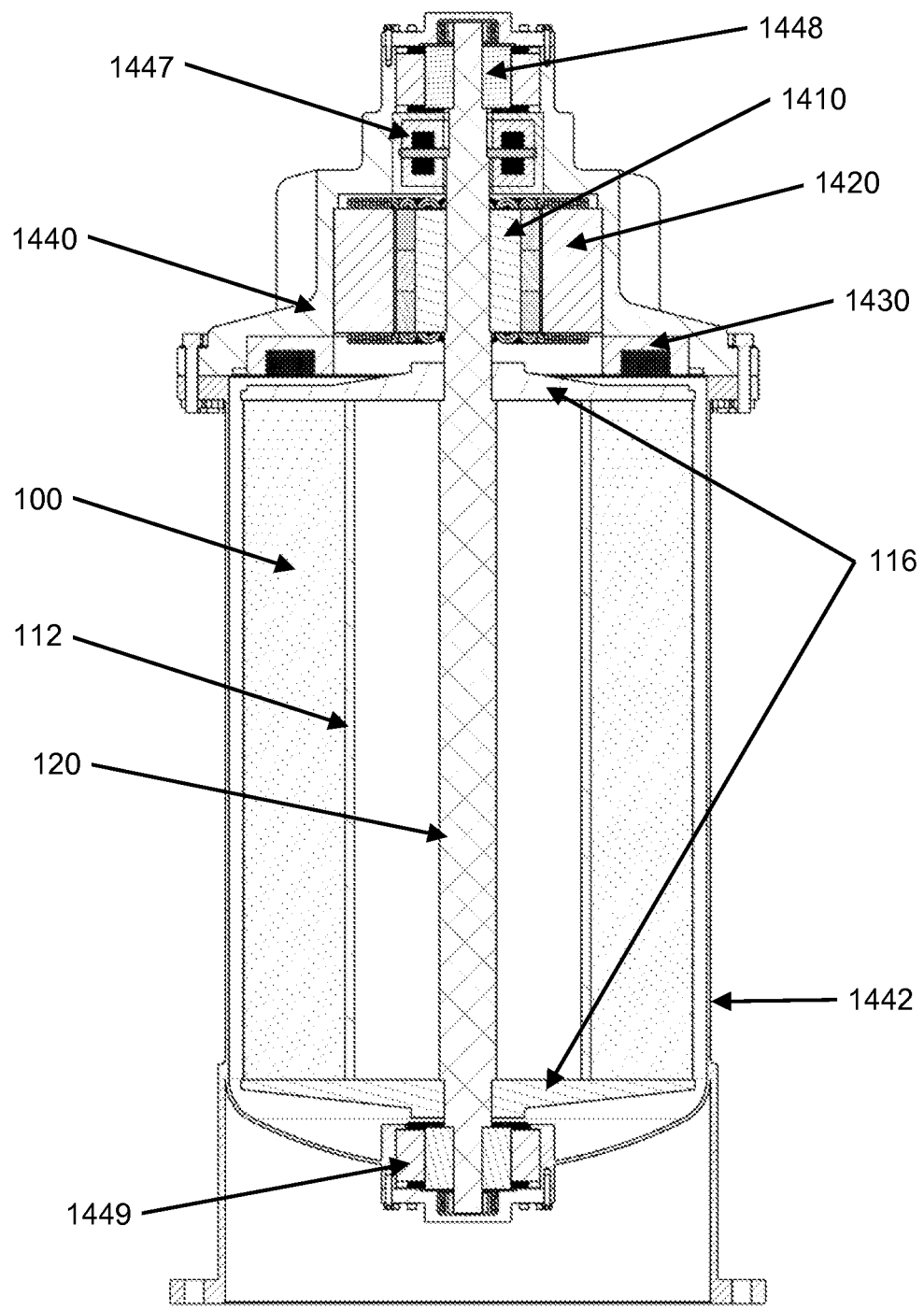
FIG. 14 is a cross-section of a flywheel system using a wire-wound rotor.

FIG. 14 is a cross-section of a flywheel system using a wire-wound rotor. The flywheel system includes the following rotating parts: shaft 120, end plates 116, cylindrical drum 112, wire mass 100, and motor rotor 1410. The static elements of the flywheel assembly include the head cover 1440, housing 1442, motor stator 1420, and lifting magnet 1430. The upper bearing 1448, thrust bearing 1447 and lower bearing 1449 have both rotating and non-rotating elements. The motor rotor 1410 and motor stator 1420 form a motor/generator that converts energy between electrical form and the kinetic form stored by the flywheel. For convenience, this device may be referred to simply as a motor, although it is to be understood that it may operate as both a motor (using electrical energy to drive the flywheel) and as a generator (using flywheel kinetic energy to produce electricity).

Typically, wire 100 comprises greater than 50% of the weight of the rotor. The wire 100 may be wound in zones where the tension, gauge, and material grade of the wire vary from zone to zone. Alternately, the wire 100 may be wound in a single zone with uniform tension, gauge, and material properties.

End plates 116 mounted on a central shaft 120 locate and secure a cylinder 112 so that it is concentric with the shaft 120. The channel formed by the end plates 116 and the cylinder 112 is the region into which the wire 100 is wound. This configuration is intended to achieve low cost by using a single massive fastener (nut) to secure the stack of two plates 116 and cylinder 112. This can eliminate the need for thermal assembly, welding, or large numbers of machined features (bolt patterns). Alternately, the cylinder may be omitted and the wire 100 may be wound directly onto the shaft 120.

The shaft 120 extends outward from the end plates 116 providing locations to which the motor rotor 1410 and the rotating portion of the upper bearing 1448, thrust bearing 1447, and lower bearing 1449 are affixed.

With the exception of the lower bearing 1449, the major static elements that act on the rotating assembly including the upper bearing 1448, thrust bearing 1447, motor stator 1420, and lifting magnet 1430 are all mounted into the head cover 1440. The head cover 1440 and housing 1442 comprise a vacuum barrier. Using the head cover 1440 both as a mounting structure and as part of the vacuum enclosure eliminates the need for a separate mounting structure and reduces cost. Furthermore, several of the components generate heat and mounting the components to the head cover 1440 provides a consolidated and lower cost heat removal solution than having to remove heat from components not mounted to the outer case.

The weight of the rotating assembly is supported by a lifting magnet 1430 acting directly on the upper end plate 116. Alternately, the lifting magnet could act on a separate magnetic plate affixed to either the shaft 120 or end plate 116. The thrust bearing 1447 is an active magnetic bearing that provides axial stiffness and controls the vertical position of the rotating assembly. The lifting magnet 1430 may be an electromagnet, a magnetic circuit energized by a permanent magnet, or a combination of the two. An alternative to using a lifting magnet 1430 and separate thrust bearing 1447 is to actively control the lifting magnet obviating the need for a separate thrust bearing.

In this example, the flange of the head cover 1440 has a larger diameter than the housing 1442 allowing the entire assembly to be placed mostly below grade with the flange of the head cover resting at floor level and transferring the weight of the rotor to grade. Additional mounting features may be employed to affix the flywheel system to grade.

Figure 15:
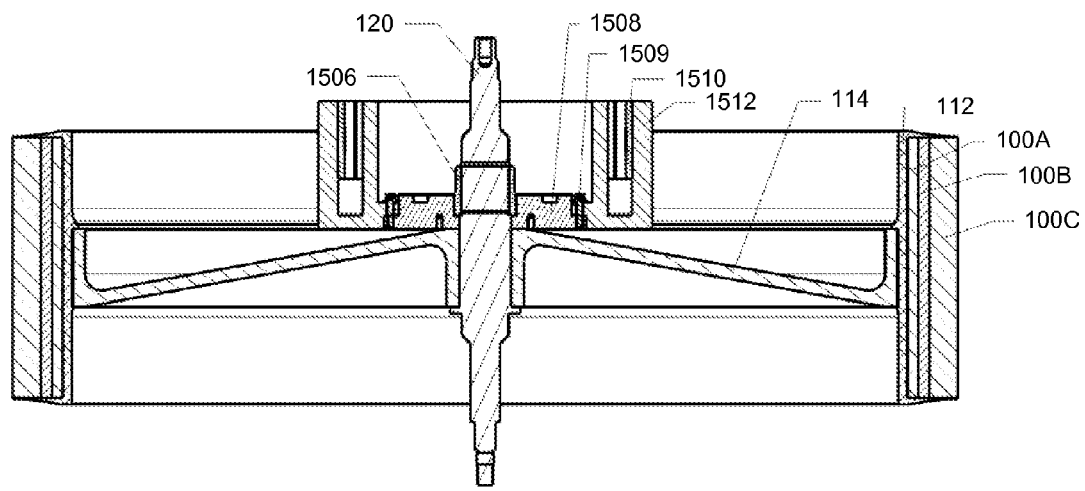
FIG. 15 is a cross-section of yet another wire-wound rotor assembly.

FIG. 15 is a cross-section of yet another wire-wound rotor assembly. This assembly uses a small central shaft 120 onto which a thrust disk 1508 and a hub 114 are assembled. The thrust disk 1508 supports the rotor portion of a motor comprising a back iron 1512 and magnets 1510. A rim 112 is mounted on hub 114. A first wire zone 100A, a second wire zone 100B, and a third wire zone 100C are wound into an annular channel fabricated in the rim 112. The rim is made from forged or other high strength steel. The drawn steel wire has a much higher strength than the rim. Wire comprises greater than 50% of the weight of the rotor. Wire is wound onto the rotor in a first wire zone 100A, a second wire zone 100B, and a third wire zone 100C, where the preload tension applied may vary from zone to zone (and possibly also within each zone).

Typically, the rim 112 and hub 114 will be made from material that has less strength than the wire. Winding tension during winding is controlled so that after assembly and while at rest, the rim 112 and hub 114 experience compression and the wire on average experiences tension although the tension from the third wire zone 100C may be sufficient to drive the first wire zone 100A and second wire zone 100B into compression while at rest.

The rim 112 is assembled to the hub 114 by a press fit, an interference fit through thermal assembly, a clearance fit with the rim 112 compressed to the hub 114 by the tension built into the wire 100 during winding or by any combination of these attachment methods. Alternately, the rim 112 and hub 114 may be a single part.

The hub 114 is assembled to the shaft 120 with a press fit, an interference fit through thermal assembly, a clearance fit with the hub 114 secured to the shaft 120 by a nut 1506, or any combination of these attachment methods. Alternatively, the hub 114 and the shaft 120 may be a single part.

The rotor is shown with a motor back iron 1512 attached to the shaft 120 via a thrust disk 1508 where the thrust disk 1508 supports the weight of the rotor when it is acted upon by a lifting magnet. Other configurations are possible, including mounting the motor magnets 1510 and back iron 1512 directly to the hub 114 or shaft 120, making the back iron and/or the thrust disk 1508 integral features of the hub 114 or the shaft 120 or the rim 112, or using an axial gap machine rather than a radial gap machine.

In order to reduce drag loss, energy storage flywheels typically operate in vacuum. This eliminates the possibility of convective cooling of any heat deposited in the rotor. The main paths for heat transfer from the motor rotor are through radiation and through the bearings, if ball bearings are used. Radiating heat through a vacuum is inefficient. Failure to transfer heat away from the rotor and out to the ambient environment can lead to elevated temperatures within the vacuum vessel and particular on the rotor, which can negatively affect material properties leading to degraded lifetime and performance of the flywheel rotor, motor/generator and associated components. Therefore it is advantageous for the flywheel motor to be constructed so as to prevent the deposition of significant heat on the rotor.

As the primary source of heat in the rotors of ordinary motors comes from eddy currents induced by time varying magnetic flux, one way to drastically reduce rotor heating in a flywheel motor is to construct the motor rotor from materials that do not conduct electricity. One solution is a permanent magnet machine using magnets that do not conduct electricity.

Figure 16:
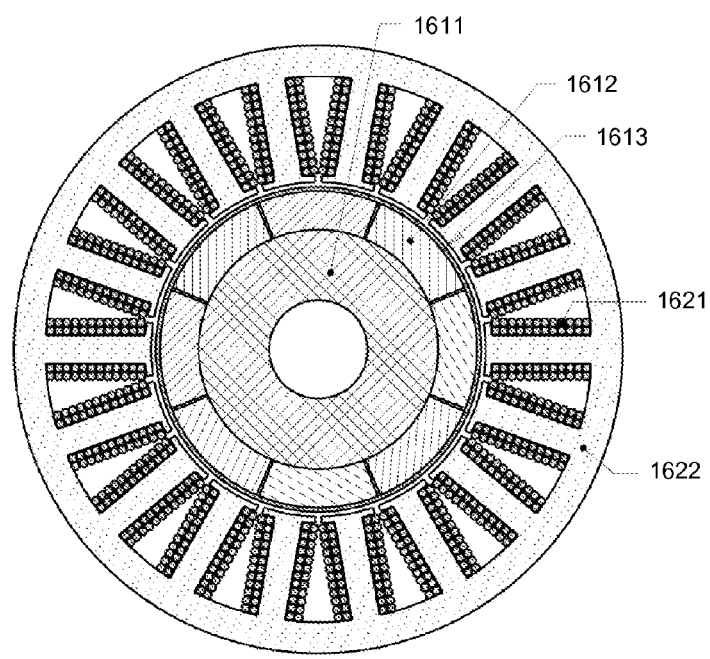
FIG. 16 is a cross-section of a flywheel motor using permanent magnets.

FIG. 16 is a cross-section of a flywheel motor using permanent magnets. The motor shown here corresponds to the rotor 1410 and stator 1420 in FIG. 14. The rotating portion of the motor-generator includes the rotor core 1611, magnets 1612 and sleeve 1613. The stationary portion of the motor includes windings 1621 and the stator core 1622. The inside rotor configuration is preferred because it keeps the stator on the outside periphery where it can be conveniently cooled. However, in alternate embodiments, the rotor could be on the exterior with the magnets lined on the inner bore and rotated around the stator which is positioned in the center.

In order to attain low loss and prevent rotor heating, the rotating components that experience a time varying magnetic flux preferably are made from electrically non-conductive material. The rotor core 1611 is made from a magnetically permeable material that mitigates against eddy currents. The preferred material is laminated magnetic steel although powdered core material may be used. The magnets 1612 are permanent magnets that are made from a magnetic material that is not electrically conductive. Preferably the magnets 1612 are made from (ceramic) ferrite or bonded magnetic particles although other magnetic materials that do not conduct electricity could also be used. Suitable materials include barium iron oxide ($BaFe_2O_3$) and strontium iron oxide ($SrFe_2O_3$) ferrite magnets. For comparison, these magnets typically have a resistivity on the order of 1E6 Ohm cm, whereas more conventional conducting magnets (NdFeB for example) might have a resistivity on the order of 1E-6 Ohm cm. The magnets 1612 are secured to the rotor core 1611 with a sleeve 1613. The sleeve 1613 should also be electrically non-conducting. A suitable material for the sleeve 1613 is filament wound glass composite, although other strong non-conducting materials such as plastic, resin, and other composites (e.g., carbon composite and Kevlar composite) are good candidates.

In this example, the stator core 1622 is built from laminated magnetic steel in order to reduce eddy current losses. The magnets 1612 have a plurality of poles with 8 poles shown. A greater or lesser number of poles may be used. The stator core 1622 is shown with 18 slots. A greater or lesser number of slots may be used.

In a different approach, a rotor disc is placed in between two stator discs forming an internal rotor configuration. The rotor is constructed from a ferromagnetic back iron with axially magnetized wedge shaped ferrite permanent magnets inserted into the slots along the circumference of the back iron. With this beneficial configuration, the ferrite magnets are radially constrained by the back iron which greatly reduces the mechanical stresses experienced by the ferrite magnets when they undergo high speed rotation. The rotor is attached to the shaft extending from the steel flywheel rotor, while the stator can be constructed with a ferromagnetic core or can be coreless to eliminate core losses generated at the stator back iron. The stator winding may be concentrated so that the end turns are reduced to lower the $I^2R$ loss and increases the power density of the machine but it also can be distributed winding to further eliminate the harmonics induced by the spatial distribution of the stator windings. The stator windings can be actively cooled to eliminate excess heat buildup thus preventing damage done onto the permanent magnet motor/generator.

In another embodiment of the axial flux permanent magnet motor, two rotors are placed on either side of a stator disc. The bottom rotor can be integrated with the steel flywheel rotor, therefore eliminating an extra rotor ferromagnetic disc, while the top rotor disc is constructed from a separate ferromagnetic disc where the disc is attached to the shaft of the steel flywheel rotor. The wedge shaped ferrite magnets are strategically placed onto the inner side of the top and bottom rotors so as to face the stator, where the stator windings can be either concentrated or distributed type.

In yet another embodiment of the axial flux permanent magnet motor/generator, there is only one rotor and one stator. The rotor is preferably located below the stator, with this arrangement the steel flywheel rotor can act both as an energy storage device and back iron of the motor/generator thus saving the part count and cost of manufacturing for a separate rotor back iron. The permanent magnet motor/generator can be integrated with the magnetic thrust bearing to control the position of the flywheel rotor.

In another variation of the radial flux permanent magnet motor/generator, the direction of the armature reaction flux generated by the stator is perpendicular to the axial direction of the flywheel rotor. In this configuration the arc shaped ferrite magnets are placed at the inner bore of an external rotor where this rotor is constructed from a cylindrical back iron extending from the steel flywheel rotor. The stator is then inserted into the inner circumference of the external rotor. The stator has a solid ferromagnetic back iron with its windings wound onto the stator slots. The stator windings can be actively cooled to prevent damage done onto the permanent magnet motor/generator.

An alternative to the use of non-conducting magnet material in the motor rotor is to use a rare earth magnet material such as neodymium iron boron (NdFeB). This material conducts electricity. In order to reduce heating of the rotor due to eddy currents in the magnet material, the motor configuration is implemented so as to avoid the creation of eddy currents within the magnet material. This can be accomplished by designing an ironless stator core where all of the iron elements of the motor are rotating.

Flywheel energy storage systems, such as those described above, can provide much-needed services to the utility electricity grid. Examples of these services can include peak shaving, frequency regulation, renewable integration, load ramping, voltage support, transmission congestion relief, and transmission upgrade deferral.

In one application, flywheel energy storage systems are used for frequency regulation. The electric power system must balance generation with load. Any mismatch causes frequency excursions. Generation in excess of load results in an upward frequency excursion and load in excess of generation causes a downward frequency excursion. Frequency regulation is critical in order to ensure that all grid connected generators operate in phase. In the past, utilities have accomplished this by matching generation to the load, for example by increasing or decreasing the actual power generation to match the load.

Flywheel energy storage systems can be used to achieve the same effect. A flywheel energy storage system is connected to the grid, and a controller transfers energy between the flywheel energy storage system and the grid. When generation exceeds load, the excess generated energy can be stored in the flywheel system. When load exceeds generation, the shortfall in energy can be provided by the flywheel system. Storage of electrical energy can be ideal for frequency regulation and other ancillary services. Storage is bi-directional and can provide or absorb energy. Storage can respond much more rapidly than generation. Storage does not experience the reduction in efficiency that generation does in response to varying load. Flywheels are particularly well suited to this application.

Although the detailed description contains many specifics, these should not be construed as limiting the scope of the invention but merely as illustrating different examples and aspects of the invention. It should be appreciated that the scope of the invention includes other embodiments not discussed in detail above. Various other modifications, changes and variations which will be apparent to those skilled in the art may be made in the arrangement, operation and details of the method and apparatus of the present invention disclosed herein without departing from the spirit and scope of the invention as defined in the appended claims. Therefore, the scope of the invention should be determined by the appended claims and their legal equivalents.

In the claims, reference to an element in the singular is not intended to mean "one and only one" unless explicitly stated, but rather is meant to mean "one or more." In addition, it is not necessary for a device or method to address every problem that is solvable by different embodiments of the invention in order to be encompassed by the claims.

What is claimed is:

1. A wire-wound rotor for use in a flywheel rated for an operational speed range, the rotor comprising:
   a flywheel core with a winding surface; wherein the flywheel core includes a drum and a plurality of support brackets radially extending beyond an outer surface of the drum; and
   a mass of wire-drawn steel wound onto the drum of the flywheel core, the steel wire preloaded such that all layers of wire exert a net radial force that is compressive throughout the operational speed range of the flywheel, wherein the support brackets extend beyond an outer layer of the mass of wire-drawn steel wound onto the drum of the flywheel core.

2. The wire-wound rotor of claim 1 wherein the steel wire has a tensile strength and a yield strength of at least 250,000 psi.

3. The wire-wound rotor of claim 1 wherein the steel wire has a tensile strength and a yield strength of at least 300,000 psi.

4. The wire-wound rotor of claim 1 wherein the steel wire has a tensile strength and a yield strength of at least 400,000 psi.

5. The wire-wound rotor of claim 1 wherein the steel wire has a carbon concentration of between 0.50% and 0.99%.

6. The wire-wound rotor of claim 1 wherein at least one property of the steel wire changes as a function of radial position within the wire mass.

7. The wire-wound rotor of claim 6 wherein a diameter of the steel wire changes as a function of radial position within the wire mass.

8. The wire-wound rotor of claim 6 wherein the steel wire in an inner layer of the wire mass has a lower fatigue strength than the steel wire in an outer layer of the wire mass.

9. The wire-wound rotor of claim 1 wherein successive layers of steel wire are wound to cross each other.

10. The wire-wound rotor of claim 1 wherein successive layers of steel wire are wound along a same direction.

11. The wire-wound rotor of claim 1 wherein the wire mass comprises at least two separate segments of steel wire located at different radial positions.

12. The wire-wound rotor of claim 1 wherein the wire mass comprises at least two separate segments of steel wire located at different axial positions.

13. The wire-wound rotor of claim 1 further comprising a matrix material used to fix the steel wire within the wire mass.

14. The wire-wound rotor of claim 13 wherein the matrix material is an epoxy resin.

15. The wire-wound rotor of claim 13 wherein the matrix material is a vinyl ester resin.

16. The wire-wound rotor of claim 1 wherein the outermost layer of steel wire is mechanically constrained within the wire mass.

17. The wire-wound rotor of claim 1 wherein the steel wire is rectangular steel wire.

18. The wire-wound rotor of claim 1 wherein the wire is preloaded such that all layers of wire experience tension hoop stress at 0 rpm.

19. The wire-wound rotor of claim 1 wherein the wire is preloaded such that some layers of wire experience compressive hoop stress at 0 rpm.

20. The wire-wound rotor of claim 1 wherein the wire is preloaded such that the preload increases monotonically as a function of radial position within the wire mass.

21. The wire-wound rotor of claim 1 wherein the preload is established by winding the wire onto the flywheel core under a winding tension.

22. The wire-wound rotor of claim 21 wherein the winding tension is constant for substantially all wire in the wire mass.

23. The wire-wound rotor of claim 21 wherein the winding tension varies as a function of radial position within the wire mass.

24. The wire-wound rotor of claim 21 wherein the winding tension increases monotonically as a function of radial position within the wire mass.

25. The wire-wound rotor of claim 1 wherein the operational speed range includes a tip speed for the wire mass of 200 m/s.

26. The wire-wound rotor of claim 1 wherein the operational speed range includes a tip speed for the wire mass of in a range of 75 m/s to 500 m/s.

27. The wire-wound rotor of claim 1 wherein an inner diameter of the wire mass is less than 85% of an outer diameter of the wire mass.

28. The wire-wound rotor of claim 27 wherein an inner diameter of the wire mass is in a range of 20-75% of an outer diameter of the wire mass.

29. The wire-wound rotor of claim 1 wherein an inner diameter of the wire mass is in a range of 75-95% of an outer diameter of the wire mass.

30. The wire-wound rotor of claim 1 wherein the wire mass accounts for at least 50% of a total mass of the rotor.

31. The wire-wound rotor of claim 1 wherein the flywheel core is solid metal occupying all of the space between a shaft and the winding surface.

32. The wire-wound rotor of claim 1 wherein the flywheel core comprises a hub and an annular drum, the hub extending from a shaft to an inner surface of the drum, the hub occupying less than all of the space between the shaft and the inner surface of the drum, the outer surface of the drum being the winding surface.

33. The wire-wound rotor of claim 1 wherein the flywheel core comprises wound wire bound with a matrix material.

34. The wire-wound rotor of claim 1 wherein the flywheel core comprises:
   a cylindrical drum having an outer surface that serves as the winding surface; and
   at least two end plates affixed to the cylindrical drum, to form a channel with the winding surface, the wire mass occupying the channel.

35. A flywheel assembly comprising:
a shaft;
the wire-wound rotor of claim 1 fixed to the shaft; and
a motor having a motor rotor and a motor stator, the motor rotor fixed to the shaft and using electrically non-conductive permanent magnets.

36. The flywheel assembly of claim 35 further comprising:
a vacuum vessel, wherein the shaft, wire-wound rotor and motor rotor are located inside the vacuum vessel and rotate in a vacuum.

37. The flywheel assembly of claim 35 wherein the permanent magnets comprise ceramic ferrite magnets.

38. The flywheel assembly of claim 37 wherein the permanent magnets comprise barium iron oxide ($BaFe_2O_3$) magnets.

39. The flywheel assembly of claim 37 wherein the permanent magnets comprise strontium iron oxide ($SrFe_2O_3$) magnets.

40. The flywheel assembly of claim 35 wherein the permanent magnets have a resistivity of at least 1E6 ohm cm.

41. The flywheel assembly of claim 35 wherein the motor is a radial gap motor.

42. The flywheel assembly of claim 41 wherein the motor rotor is radially located inside of the motor stator and faces outward, the motor stator facing inward.

43. The flywheel assembly of claim 41 wherein the motor rotor is radially located outside of the motor stator and faces inward, the motor stator facing outward.

44. The flywheel assembly of claim 35 wherein the motor is an axial gap motor.

45. The flywheel assembly of claim 44 wherein the motor rotor includes a disk located between two motor stator disks.

46. The flywheel assembly of claim 44 wherein the motor stator includes a disk located between two motor rotor disks.

47. The flywheel assembly of claim 35 wherein the motor rotor further comprises a non-conductive sleeve to mechanically support the permanent magnets.

48. The flywheel assembly of claim 35 further comprising:
a head cover and a housing, which together form a vacuum vessel, wherein the shaft, wire-wound rotor and motor rotor are located inside the vacuum vessel and rotate in a vacuum, the head cover located mostly above grade and the housing located mostly below grade, the flywheel rotor located mostly within the housing.

49. The flywheel assembly of claim 48 further comprising:
an upper bearing, a thrust bearing, and a lifting magnet, all of which and the motor stator are mechanically fixed to the head cover.

50. A frequency regulation system comprising:
a flywheel energy storage system connected to a utility electricity grid, the flywheel energy storage system comprising at least one flywheel assembly, the flywheel assembly comprising:
the wire-wound rotor of claim 1; and
a motor having a motor rotor and a motor stator, the motor rotor using electrically non-conductive permanent magnets, the motor rotor and flywheel rotor mechanically fixed to rotate together; and
a controller that transfers energy between the flywheel energy storage system and the utility electricity grid based on mismatches between electricity generation on the grid and electricity load on the grid.

51. The wire-wound rotor of claim 1, wherein the wire is preloaded as the wire is being wounded around the flywheel core.

52. The wire-wound rotor of claim 1, wherein the wire is preloaded with a stress larger than 50,000 psi.

* * * * *